US009816025B2

(12) United States Patent
Dobson, Jr. et al.

(10) Patent No.: US 9,816,025 B2
(45) Date of Patent: Nov. 14, 2017

(54) METHODS AND COMPOSITIONS FOR THE CONTROLLED CROSSLINKING AND VISCOSIFYING OF WELL SERVICING FLUIDS UTILIZING MIXED BORATE HYDROCARBON-BASED SUSPENSIONS

(71) Applicant: TUCC Technology, LLC, Houston, TX (US)

(72) Inventors: James W. Dobson, Jr., Houston, TX (US); Kimberly A. Pierce, Houston, TX (US)

(73) Assignee: TUCC Technology, LLC, Houston, TX (US)

( * ) Notice: Subject to any disclaimer, the term of this patent is extended or adjusted under 35 U.S.C. 154(b) by 262 days.

(21) Appl. No.: 13/938,220

(22) Filed: Jul. 9, 2013

(65) Prior Publication Data
US 2014/0034323 A1 Feb. 6, 2014

Related U.S. Application Data

(60) Provisional application No. 61/669,282, filed on Jul. 9, 2012.

(51) Int. Cl.
*E21B 43/26* (2006.01)
*C09K 8/68* (2006.01)
*E21B 43/267* (2006.01)
*C09K 8/90* (2006.01)

(52) U.S. Cl.
CPC .............. *C09K 8/685* (2013.01); *C09K 8/90* (2013.01); *E21B 43/26* (2013.01); *E21B 43/267* (2013.01); *C09K 2208/26* (2013.01)

(58) Field of Classification Search
CPC ................................ E21B 43/25; C09K 8/685
See application file for complete search history.

(56) References Cited

U.S. PATENT DOCUMENTS

| 5,350,528 | A | | 9/1994 | Westland et al. |
| 5,372,732 | A | | 12/1994 | Harris et al. |
| 5,460,226 | A | | 10/1995 | Lawson et al. |
| 5,633,220 | A | * | 5/1997 | Cawiezel et al. ............ 507/117 |

(Continued)

OTHER PUBLICATIONS

Lei, C. and Clark, P.E., "Crosslinking of Guar and Guar Derivatives", SPE Paper No. 90840, pp. 1-12 (2004).

(Continued)

*Primary Examiner* — Angela M DiTrani
*Assistant Examiner* — Andrew H Sue-Ako
(74) *Attorney, Agent, or Firm* — Lewis, Reese & Nesmith, PLLC

(57) ABSTRACT

Disclosed are treating fluid compositions for use in subterranean workover and hydrocarbon recovery operations, as well as methods of treating subterranean formations penetrated by a wellbore utilizing the treating fluid. The treating fluid compositions contain a first, aqueous liquid, and a crosslinkable organic polymer that is at least partly soluble in the liquid. The treating fluid further contains a borate crosslinking agent solution containing a primary, un-refined borate and a secondary, refined borate, the borate solution being present as a crosslinking agent upon addition to the first fluid admixture so as to crosslink the organic polymer and increase the viscosity and/or accelerate the crosslink time of the treating fluid.

17 Claims, 5 Drawing Sheets

(56) References Cited

U.S. PATENT DOCUMENTS

| | | | |
|---|---|---|---|
| 5,680,900 A | 10/1997 | Nguyen et al. | |
| 5,877,127 A | 3/1999 | Card et al. | |
| 6,214,773 B1 | 4/2001 | Harris et al. | |
| 6,544,934 B2 | 4/2003 | Taylor et al. | |
| 6,642,185 B2 | 11/2003 | Crews | |
| 6,737,386 B1 | 5/2004 | Moorhouse et al. | |
| 7,888,295 B2 | 2/2011 | Fu et al. | |
| 7,972,998 B2 | 7/2011 | Dessinges et al. | |
| 8,003,577 B2 | 8/2011 | Li et al. | |
| 8,114,818 B2 | 2/2012 | Reddy et al. | |
| 8,119,031 B2 | 2/2012 | Lloyd et al. | |
| 8,158,562 B2 | 4/2012 | Wilson, Jr. et al. | |
| 9,181,469 B2* | 11/2015 | Dobson, Jr. | C09K 8/685 |
| 2006/0151172 A1* | 7/2006 | Hanes et al. | 166/300 |
| 2006/0283592 A1 | 12/2006 | Sierra et al. | |
| 2009/0048126 A1 | 2/2009 | Phatak et al. | |
| 2010/0032160 A1* | 2/2010 | Wilson et al. | 166/282 |
| 2010/0048429 A1* | 2/2010 | Dobson et al. | 507/212 |
| 2010/0056401 A1* | 3/2010 | Samuel et al. | 507/211 |
| 2011/0005969 A1 | 1/2011 | Giffin | |
| 2014/0262296 A1* | 9/2014 | Dobson et al. | 166/308.5 |
| 2014/0352961 A1* | 12/2014 | Dobson et al. | 166/280.1 |

OTHER PUBLICATIONS

Ren, J.; Gerrard, D.; and Goodson, J., "Studying the Effect of Chemical Aging on the Properties of a Shape Memory Material." Offshore Technology Conference Paper OTC 21317, pp. 1-9, Offshore Technology Conference, Houston, Texas, USA (May 2-5, 2011).

GEO Drilling Fluids, Inc., Technical Services Newsletter, vol. XIII, No. 7, pp. 1-7 (Dec. 1, 2009).

\* cited by examiner

Borax Decahydrate Compaction Test

DOT Compaction Test

METHODS AND COMPOSITIONS FOR THE CONTROLLED CROSSLINKING AND VISCOSIFYING OF WELL SERVICING FLUIDS UTILIZING MIXED BORATE HYDROCARBON-BASED SUSPENSIONS

CROSS REFERENCE TO RELATED APPLICATIONS

The present application claims the benefit of and priority to U.S. Provisional Patent Application Ser. No. 61/669,282 filed on Jul. 9, 2012, the contents of which are hereby incorporated by reference in its entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to well treatment fluid compositions and methods, and more specifically are related to compositions, systems and methods for controlling crosslinking reaction times in subterranean well treatment fluids.

Description of the Related Art

Concentrated suspensions of borate-containing crosslinking agents for preparing crosslinked fracturing fluids have been exemplified in the patent literature, including U.S. Pat. No. 4,619,776, U.S. Pat. No. 5,488,083, U.S. Pat. No. 5,565,513, U.S. Pat. No. 6,225,264, and U.S. Pat. No. 6,251,838.

U.S. Pat. No. 6,936,575, U.S. Pat. No. 7,018,956, and U.S. Patent Publication No. 2010/0048429 A1 describe the use of sparingly-soluble borates, such as alkaline earth metal borates, or alkali metal alkaline earth metal borates, which are suspended in aqueous-based solutions to control crosslinking times in organic polymer-containing fracturing fluids.

However, in the aforementioned patent documents, which generally focus on the use of a single, borate-ion containing mineral incorporated in hydrocarbon-based suspensions, crosslinking times greater than about 12 minutes are generated, and often cannot be accelerated beyond a certain point utilizing any of the yet disclosed technology or techniques. In view of this, there is a need for compositions, systems, and methods for providing more precise control of delays over the crosslinking reaction of borate-containing treatment fluids, particularly aqueous-based subterranean formation treatment fluids, such as fracturing fluids.

The inventions disclosed and taught herein are directed to improved compositions, methods, and associated systems for the controlled crosslinking of well servicing fluids.

BRIEF SUMMARY OF THE INVENTION

The present disclosure relates to methods and compositions for use in subterranean operations. More particularly, in certain embodiments, the present disclosure relates to methods and compositions related to methods of increasing the viscosity or accelerating the crosslink time of a subterranean treatment fluid with a boron-containing composition that contains both un-refined and refined borates, the two types of borate materials being unequivalent.

In accordance with embodiments of the present disclosure, a method of controlling the crosslinking reaction and enhancing the viscosity of an aqueous fracturing fluid for fracturing a subterranean formation is described, the method comprising blending an aqueous fluid and a hydratable polymer that is capable of gelling in the presence of borate ions together for a period of time sufficient to form a base fluid; aging the base fluid for a period of time sufficient to render the polymer molecules in the base fluid to be at least partially hydrated; admixing an alkaline buffer in an amount sufficient to adjust the pH of the hydrated base fluid to a pH in the range from about pH 8 to about pH 12; combining a primary crosslinking agent capable of furnishing borate ions and a secondary crosslinking agent capable of furnishing borate ions in a suspension fluid so as to generate a crosslinking suspension; and adding the crosslinking suspension to the hydrated base fluid to crosslink the hydrated base fluid.

In accordance with further embodiments of the present disclosure, a composition is described, the composition comprising a fracturing fluid comprising a base fluid and a boron-containing crosslinking suspension, wherein the base fluid comprises an aqueous fluid, and an organic polymer that is capable of being crosslinked and having solubility in the aqueous fluid; and wherein the boron-containing crosslinking suspension comprises a suspension fluid; a primary crosslinking agent; and a secondary crosslinking agent.

In yet another embodiment of the present disclosure, a composition is described, the composition comprising a first liquid; an organic polymer that is capable of being crosslinked and having a solubility in the first liquid; and a borate crosslinking suspension composition comprising a second liquid; a primary crosslinking agent; and a secondary crosslinking agent. In accordance with aspects of this embodiment, the first fluid is unequivalent to the second liquid, and is an aqueous fluid which comprises substantially any aqueous fluid that does not adversely react with the constituents of the composition, subterranean formations, or fluids present therein. In accordance with this aspect, the aqueous fluid is selected from the group consisting of fresh water, natural brines, and artificial brines, wherein the artificial brines are selected from the group consisting of potassium halide solutions, sodium halide solutions, and cesium halide solutions. In further accordance with aspects of this embodiment, the organic polymer that is capable of being crosslinked is selected from the group consisting of guar or guar derivatives, galactomannan gum, cellulose, hydroxyethylcellulose, hydroxypropyl cellulose, carboxymethylcellulose, carboxymethylhydroxyethyl cellulose, xanthan gum, diutan, scleroglucan, carrageenan, polyacrylamide, and polyacrylate. In further accordance with aspects of this embodiment, the second liquid comprises a low-aromatic content hydrocarbon fluid, such as a hydrotreated light petroleum distillate.

An a further embodiment of the present disclosure, a treating fluid composition is described, the treating fluid comprising a polymer solution and a borate crosslinking composition, wherein the polymer solution comprises an aqueous fluid; a crosslinkable organic polymer having a solubility in the aqueous fluid; a viscosifier; and an alkaline buffer. The borate crosslinking composition, comprises a low-aromatic content hydrocarbon fluid; an un-refined borate crosslinking agent; and a refined borate crosslinking agent, wherein the treating fluid composition has a pH of greater than pH 8. In accordance with aspects of this embodiment, the refined borate crosslinking agent is not the same as the unrefined borate crosslinking agent.

In accordance with still further embodiments of the present disclosure, a method for formulating a boron-containing fracturing fluid having a pH greater than about 8 is described, the method comprising the steps of placing an aqueous fluid into a suitable mixing device; adding or contacting the aqueous fluid with a natural hydratable polymer to the mixture in an amount ranging from about 10 lb/1,000 gal to about 100 lb/1,000 gal of the aqueous fluid; mixing the mixture for a first predetermined period of time; adding or contacting the mixture with an alkaline buffer to the mixture in an amount sufficient to raise the pH of the mixture to a pH greater than about pH 8; mixing the mixture for a second predetermined period of time; adding to the mixture a boron-containing crosslinking suspension containing an un-refined borate crosslinking agent and a refined borate crosslinking agent in a solution, suspension, or slurry comprising at least one low-aromatic content hydrocarbon fluid; and, mixing the admixture until gelation occurs, thereby producing the fracturing fluid. In accordance with aspects of this embodiment, the aqueous fluid comprises substantially any aqueous fluid that does not adversely react with the constituents of the composition, subterranean formations, or fluids present therein. In accordance with this aspect, the aqueous fluid is selected from the group consisting of fresh water, natural brines, and artificial brines.

In accordance with further embodiments of the present disclosure, methods of hydraulically fracturing a subterranean formation penetrated by a borehole are described, the methods comprising the steps of preparing an aqueous based borate crosslinked guar fracturing fluid having a pH from about 8 to about 12, comprising: a polymer solution comprising: an aqueous fluid, a natural, hydratable polymer, and an alkaline buffer; and a boron-containing crosslinking suspension containing an un-refined borate crosslinking agent and a refined borate crosslinking agent in a low-aromatic, low-viscosity hydrocarbon fluid; pumping the fracturing fluid into the subterranean formation zone via the well bore; and permitting the fracturing fluid to gel after having substantially traversed the well bore or after having entered the subterranean formation, thereby causing hydraulic fracturing of the subterranean formation. The method may optionally further comprise the steps of adding proppants to the fracturing fluid, and utilizing the fracturing fluid to disperse the proppants throughout the subterranean formation. In further aspects of this embodiment, the method may further comprise the step of adding a breaker to the fracturing fluid to permit the removal of the fracturing fluid from the subterranean formation.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
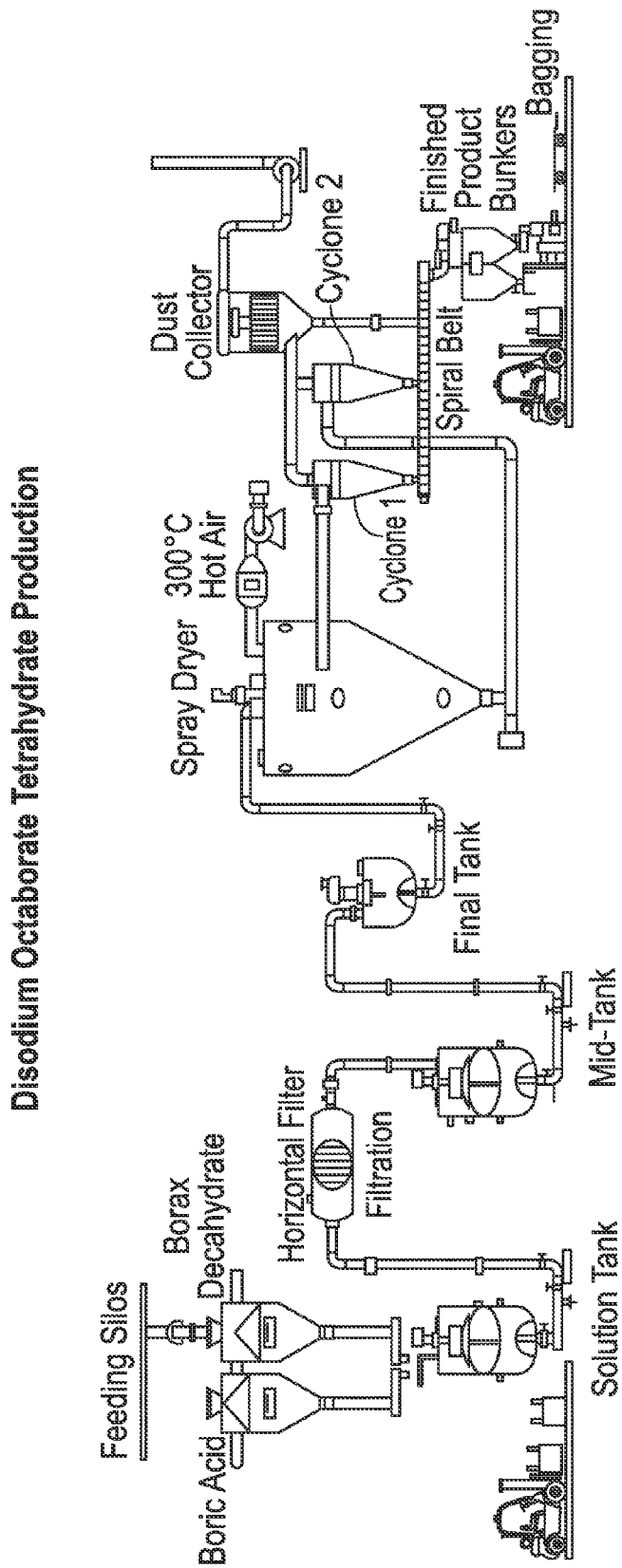
FIG. 1 illustrates a general production flow chart for the manufacture of disodium octaborate tetrahydrate (DOT).

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

The following definitions are provided in order to aid those skilled in the art in understanding the detailed description of the present invention.

The term "alkali metal", as used herein, refers to the series of elements comprising Group 1 of the Periodic Table of the Elements.

The term "alkaline earth metal", as used herein, refers to the series of elements comprising Group 2 of the Periodic Table of the Elements, wherein Group 1 and Group 2 are the Periodic Table classifications according to the International Union of Pure and Applied Chemistry, (2002).

The term "aged" or "aging", as used herein, refers to an additional period of time that a solution of polymers as described herein stands, the time being sufficient for the polymer molecules to open and extend (also referred to as "activation"), thereby exposing ionic sites of the polymer molecules to the water.

The term "dry powder", as used herein, includes any composition which is dry and flowable such as, for example, granules, flakes, spheroids, and other forms which can be readily prepared and when added to an appropriate liquid and mixed give the desired liquid solution or suspension.

The term "hydrotreated" or "hydrotreating", as used herein, refers to a catalytic process, usually carried out in the presence of free hydrogen, in which the primary purpose is the removal of various metal contaminants, such as arsenic, aluminum, and cobalt; heteroatoms, such as sulfur and nitrogen; oxygenates; or aromatics from a hydrocarbon feed stock.

Kinematic viscosity, or "KV" as used herein, refers to the measurement of the resistance to flow of a fluid under gravity. Many lubricating base oils, finished lubricants and compositions made from them, and the correct operation of equipment depends upon the appropriate viscosity of the fluid being used. Kinematic viscosity is determined by ASTM D 445-01. The results are reported in centistokes (cSt), at the temperature indicated (e.g., 40° C. or 100° C.), for example as $K_{V40}$ for a kinematic viscosity at 40° C. The kinematic viscosities of the low-viscosity base oils of this invention are between about 1 cSt and about 20 cSt, preferably between about 1.5 cSt and about 12 cSt, including values and ranges within these ranges, such as between about 1.5 cSt and about 6 cSt.

As used herein, the terms "low aromatic content" or "low aromatic base oil" means that the oil contains less than about 10% aromatics; that is, that this component of the fluid will have an aromatic content in volume percent of less than about 10%, and preferably less than about 5%.

The term "suspension" as used herein indicates a mixture in which a liquid medium contains dispersed small particles of solid material that are substantially not solubilized (insoluble) in the liquid medium. The mixture typically contains a substantially uniform distribution of solute and particulate matter throughout the liquid medium, or carrier.

The term "solution" as used herein indicates a uniform mixture of at the molecular or ionic level of one or more solutes in a liquid solvent.

As used herein, the term "oil-in-water emulsion" is used as a generic term for a mixture of two substantially immiscible phases wherein an oil (dispersed phase) is dispersed in an aqueous solution (the continuous phase).

As used herein, the term "emulsion" means a two-phase system consisting of two completely immiscible liquids, one being dispersed as fine globules in the other including colloidal dispersions of a third dissimilar solid such as wax. As used herein, the term "inverse emulsion" means a water-in-oil emulsion when water is the discontinuous phase and the hydrocarbon is in actual contact with the work surface. In select embodiments, inversion is achieved by the slow addition of water to the emulsion during the cool down phase of manufacture. As the water concentration is increased, the emulsion slowly becomes more viscous and finally reaches the inversion point, which is accompanied by rapid thinning of the system. Additional water may be added to adjust the viscosity. Inverted emulsion techniques provide for higher stability by promoting finer particle size and distribution.

As used herein, the term "un-refined borate" refers to borates that are exposed to one or more mechanical actions, including crushing, soaking, washing, sizing, and/or micronizing, but does not include any chemical refinement or processing steps.

The term "refined borate(s)" as used herein refers to borates that have been subjected to one or more chemical and mechanical processing steps, including crushing, dissolving, settling, crystallizing, filtering, and drying.

The terms "borate", and "boron-containing material", are used interchangeably herein, and refer to salts or esters of boric acid, including boron-containing minerals (those minerals that contain a borate anion group, $BO_3^-$, and borate units that are polymerized, resulting in $B_2O_4$, $B_2O_5$, $B_3O_6$, as well as other, anions) and materials, and their salts.

The term "well treatment fluid" or "well treating fluid", as used herein, refers to drilling, stimulation, completion, and workover fluids for use in hydrocarbon recovery operations from subterranean formations. Such fluids specifically include, but are not restricted to, hydraulic fracturing fluids.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created compositions for use in the controlled crosslinking of well servicing or treatment fluids that include a crosslinkable organic polymer, wherein the compositions include a primary crosslinking agent that is capable of increasing the viscosity of the treating fluid by crosslinking the organic polymer, and a secondary crosslinking agent/modifier that can accelerate the crosslinking time generated by the primary crosslinking agent. The combination of boron-containing crosslinking agents is used in crosslinking a hydratable or crosslinkable organic polymer for forming a crosslinked, gelled fluid.

The treating fluids described herein are an admixture of a first fluid formed from an aqueous fluid and one or more water-soluble (or at least partially soluble) organic polymers, and a second fluid containing a first and second boron-containing crosslinking agents in a low-viscosity and/or low-aromatic content base oil. The first and second boron-containing crosslinking agents, equivalently referred to herein as the primary and second crosslinking agents, are un-refined and refined borates, respectively, and in select aspects are not equivalent borate compounds. Preferably, the primary and secondary (un-refined and refined) borates are present in the second fluid in a ratio (in weight percent, wt. %) ranging from about 30:0.1 to about 50:20, inclusive, including ranges from about 40:0.1 to about 45:10, and from about 40:0.1 to about 50:5.

The typical crosslinkable or hydratable organic polymers, sometimes referred to equivalently herein as "gelling agents" or "solvatable polymers", that may be included in the treatment fluids and systems described herein, particularly aqueous fluids and systems, and that may be used in connection with the presently disclosed inventions, typically comprise biopolymers, synthetic polymers, or a combination thereof, wherein the 'gelling agents' or crosslinkable organic polymers are at least slightly soluble in water (wherein slightly soluble means having a solubility of at least about 0.01 kg/m$^3$) and may be considered to be hydratable (hydratable polymers). Without limitation, these crosslinkable organic polymers may serve to increase the viscosity of the treatment fluid during application. A variety of gelling agents can be used in conjunction with the methods and compositions of the present inventions, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. The gelling agents may also be biopolymers comprising natural, modified and derivatized polysaccharides, and derivatives thereof that contain one or more of the monosaccharide units selected from the group consisting of galactose, mannose, glucoside, glucose, xylose, arabinose, fructose, glucuronic acid, or pyranosyl sulfate.

Suitable gelling agents, or crosslinkable organic polymers, which may be used in accordance with the present disclosure include, but are not limited to, guar, guar derivatives (such as carboxyalkyl guar or hydroxyalkylated guar), hydroxypropyl guar (HPG), carboxymethyl guar (CMG), hydroxyethyl guar (HEC), hydroxybutyl guar (HBG), cellulose, carboxymethyl cellulose (CMC), carboxymethyl hydroxyethyl cellulose (CMHEC), hydroxyethylcellulose (HEC), carboxymethylhydroxypropyl guar (CMHPG), other derivatives of guar gum, xanthan, galactomannan gums and gums comprising galactomannans, cellulose, and other cellulose derivatives, derivatives thereof, and combinations thereof, such as various carboxyalkylcellulose ethers, such as carboxyethylcellulose; mixed ethers such as carboxyalkylethers; hydroxyalkylcelluloses such as hydroxypropylcellulose; alkylhydroxyalkylcelluloses such as methylhydroxypropylcellulose; alkylcelluloses such as methylcellulose, ethylcellulose and propylcellulose; alkylcarboxyalkylcelluloses such as ethylcarboxymethylcellulose; alkylalkylcelluloses such as methylethylcellulose; hydroxyalkylalkylcelluloses such as hydroxypropylmethylcellulose; biopolymers such as xanthan, diutan, and scleroglucan; combinations thereof, and the like. Preferably, in accordance with one non-limiting embodiment of the present disclosure, the gelling agent is guar, hydroxypropyl guar (HPG), or carboxymethylhydroxypropyl guar (CMHPG), alone or in combination.

It is sometimes preferred that the hydratable organic polymer, such as guar or hydroxyalkylated guar, has a molecular weight ranging from about 1 million to about 3 million. The carboxyl content of the hydratable polysaccharides is typically expressed as the 'Degree of Substitution' (DS), and the DS of the carboxylated guar is typically in the range of from about 0.08 to about 0.18. The hydroxypropyl content of the hydroxyalkylated guar, expressed as Molar Substitution (defined as the number of moles of hydroxyalkyl groups per mole of anhydroglucose), is typically in the range of from about 0.25 to about 0.6. Further preferred as the hydratable organic polymer in certain aspects of the invention include those polymers available from a number of commercial sources (e.g., Baker Hughes) as GW-3 (highly refined guar gum), GW-4 (guar), GW-2 (guar), "GW45" (CMG), "GW32" (HPG) and "GW38" (CMHPG). Slurried counterparts of these hydratable organic polymers may also be used and are available from a variety of commercial sources, under a variety of names, such as "GLFC-5" (a high-yield guar gum, GW-3 slurried in mineral oil), "GLFC2" (HPG), "GLFC2B" (HPG), "GLFC3" (CMPHG), "GLFC3B" (CMHPG), "XLFC2" (HPG), "XLFC2B" (HPG), "XLFC3" (CMPHG), "XLFC3B" (CM-HPG), "VSP1" (CMG), and "VSP2" (CMG).

Non-limiting examples of suitable synthetic polymers include acrylamide polymers, vinyl sulfonates, and the like. An acrylamide polymer maybe a polymer or copolymer of acrylamide useful as, e.g., a friction reducing agent for slickwater fracturing treatments. Even though these acrylamide polymers are often called "polyacrylamide", many are actually copolymers of acrylamide and one or more other chemical species. The main consequence is to give the "modified" polyacrylamide some ionic character. The polyacrylamide may also be used as a homopolymer. As used herein, the expression "polyacrylamide" is meant to encompass acrylamide homopolymers and copolymers, or any suitable synthetic form of polyacrylamide. As used herein, "homopolymers" are those polymers containing less than about 0.1% by weight of other co-monomers. Combinations or mixtures of homopolymers and copolymers may be used as well. The copolymers may include two or more different co-monomers and may be random or block copolymers. The co-monomers may include, for example, sodium acrylate. The polyacrylamide polymers and copolymers useful for the invention may include those having a number-average molecular weight ($M_n$) or a weight-average molecular weight ($M_w$) of from about 1000, or lower, to about 20 million, or above, with from about 1 million to about 5 million being typical. Typically, the amount of hydratable polymer, or gelling agent, employed can vary widely, but can be preferably in the range of about 15 to about 50, or about 20 to about 30, pounds per 1,000 gallons of aqueous liquid medium (e.g., water) in the fluid. In at least some aspects of the present disclosure, the amount of liquid medium is preferably minimized to employ the least amount possible while still achieving the desired level of polymer hydration.

Additional natural polymers suitable for use as crosslinkable organic polymers/gelling agents in accordance with the present disclosure include, but are not limited to, locust bean gum, tara (*Cesalpinia spinosa lin*) gum, konjac (*Amorphophallus konjac*) gum, starch, cellulose, karaya gum, xanthan gum, tragacanth gum, arabic gum, ghatti gum, tamarind gum, carrageenan and derivatives thereof. Additionally, synthetic polymers and copolymers that contain any of the above-mentioned functional groups may also be used. Non-limiting examples of such synthetic polymers include, but are not limited to, polyacrylate, polymethacrylate (also known as PMMA, poly(methyl methacrylate)), polyacrylamide (poly(2-prop-enamide)), polyvinyl alcohol (PVA), styrene maleic anhydride (SMA), methylvinyl ether copolymers, and polyvinylpyrrolidone (PVP).

Generally speaking, the amount of a hydratable, crosslinkable organic polymer that may be included in a treatment fluid for use in conjunction with the present disclosure depends on the viscosity of the resultant treatment fluid desired. Thus, the amount to include will be an amount effective to achieve a desired viscosity effect. In certain exemplary embodiments of the present inventions, the gelling agent may be present in the treatment fluid in an amount in the range of from about 0.1% to about 60% by weight of the treatment fluid. In other exemplary embodiments, the gelling agent may be present in the range of from about 0.1% to about 20% by weight of the treatment fluid. In general, however, the amount of crosslinkable organic polymer included in the well treatment fluids described herein is not particularly critical so long as the viscosity of the fluid is sufficiently high to keep the proppant particles or other additives suspended therein during the fluid injecting step into the subterranean formation. Thus, depending on the specific application of the treatment fluid, the crosslinkable organic polymer may be added to the aqueous base fluid in concentrations ranging from about 15 to 60 pounds per thousand gallons (lb/1,000 gal.; "pptg") by volume of the total aqueous fluid (1.8 to 7.2 kg/m$^3$). In a further non-limiting range for the present inventions, the concentration may range from about 20 lb/1,000 gal. (2.4 kg/m$^3$) to about 40 lb/1,000 gal. (4.8 kg/m$^3$). In further, non-restrictive aspects of the present disclosure, the crosslinkable organic polymer/gelling agent present in the aqueous base fluid may range from about 25 lb/1,000 gal. (about 3 kg/m$^3$) to about 40 lb/1,000 gal. (about 4.8 kg/m$^3$) of total fluid. One skilled in the art, with the benefit of this disclosure, will recognize the appropriate gelling agent and amount of the gelling agent to use for a particular application. Preferably, in accordance with one aspect of the present disclosure, the fluid composition or well treatment system will contain from about 1.2 kg/m$^3$ (0.075 lb/ft$^3$) to about 12 kg/m$^3$ (0.75 lb/ft$^3$) of the gelling agent/crosslinkable organic polymer, most preferably from about 2.4 kg/m$^3$ (0.15 lb/ft$^3$) to about 7.2 kg/m$^3$ (0.45 lb/ft$^3$).

The base fluid of the well treatment fluids, particularly in the first aqueous solution that includes a crosslinkable organic polymer, that may be used in conjunction with the compositions and methods of these inventions preferably comprise an aqueous-based fluid, although they may optionally also further comprise an oil-based fluid, or an emulsion as appropriate. The aqueous (water)-based fluid may be from any source provided that it does not contain compounds that may adversely affect other components in the treatment fluid. The base fluid may comprise a fluid from a natural or synthetic source. In certain exemplary embodiments of the present inventions, an aqueous-based fluid may comprise fresh water or salt water depending upon the particular density of the composition required. The term "salt water" as used herein may include unsaturated salt water or saturated salt water "brine systems", such as a NaCl, or KCl brine, as well as heavy brines including $CaCl_2$, $CaBr_2$, NaBr, KBr, $ZnBr_2$, ZnCl2, $ZnBr_2/CaBr_2$, $ZnBr_2/KBr$, sodium formate ($NaCO_2H$), cesium formate ($CsCO_2H$), and potassium formate ($KCO_2H$). The brine systems suitable for use herein may comprise from about 1% to about 75% by weight of an appropriate salt, including about 3 wt. %, about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, and about 75 wt. % salt, without limitation, as well as concentrations falling between any two of these values, such as from about 21 wt. % to about 66 wt. % salt, inclusive. Generally speaking, the base fluid will be present in the well treatment fluid in an amount in the range of from about 2% to about 99.5% by weight. In other exemplary embodiments, the base fluid may be present in the well treatment fluid in an amount in the range of from about 70% to about 99% by weight. Depending upon the desired viscosity of the treatment fluid, more or less of the base fluid may be included, as appropriate. One of ordinary skill in the art, with the benefit of this disclosure, will recognize an appropriate base fluid and the appropriate amount to use for a chosen application.

In accordance with exemplary methods of the present disclosure, an aqueous fracturing fluid, as a non-limiting example, is first prepared by blending one or more crosslinkable organic polymers into a liquid, which may be a hydrocarbon, such as light distillate, or water, or an aqueous base fluid, depending on the particular subterranean well being treated. The aqueous base fluid may be, for example, water, brine (e.g., a NaCl or KCl brine), aqueous-based foams or water-alcohol mixtures. The brine base fluid may be any brine, conventional or to be developed which serves as a suitable media for the various components. As a matter of convenience, in many cases the brine base fluid may be the brine available at the site used in the completion fluid, for a non-limiting example.

Any suitable mixing apparatus may be used for this procedure. In the case of batch mixing, the crosslinkable organic polymer, such as guar or a guar derivative, and the aqueous fluid are blended for a period of time sufficient to form a gelled or viscosified solution. The organic polymer that is useful in the present inventions is preferably any of the hydratable or solvatable polysaccharides, as described herein above, and in particular those hydratable polysaccharides which are capable of gelling in the presence of a crosslinking agent to form a gelled base fluid. The most preferred hydratable polymers for the present inventions are guar gums, carboxymethyl hydroxypropyl guar and hydroxypropyl guar, as well as combinations thereof. In other embodiments of the present disclosure, the crosslinkable organic polymer, or gelling agent, may be depolymerized, as necessary. The term "depolymerized," as used herein, generally refers to a decrease in the molecular weight of the gelling agent. Depolymerized polymers are described in U.S. Pat. No. 6,488,091, the relevant disclosure of which is incorporated herein by reference as appropriate.

In addition to the aqueous base fluid and hydratable/crosslinkable organic polymer, the treatment fluid of the present disclosure comprises a crosslinking composition, which is used to crosslink the hydratable organic polymer and create a crosslinked, viscosified and gelled treatment fluid. In accordance with the instant disclosure, the crosslinking composition comprises a primary boron-containing material, which is an un-refined borate crosslinking agent, and a secondary boron-containing material, which is a refined borate crosslinking agent, wherein the secondary material, which is a refined borate crosslinking agent, is not the same as the primary boron-containing agent.

The distinction between the primary and secondary boron-containing materials for use in the current compositions and methods is linked to the type of processing that the borate material has undergone prior to use in these compositions. As indicated above, such processing can yield a product that is termed "refined" or "un-refined." The processing for each of the commercially available un-refined borate minerals is a comparatively simple procedure, involving largely coarse, mechanical operations. The desire for good purity, low costs, high recovery and efficiency has led to often complex operational variations involving both chemical and mechanical operations so as to produce highly beneficiated, refined borates. The general processing technology for un-refined (alkaline earth metal borates and/or alkali metal alkaline earth metal borates) and refined borates (borax, boric acid, or disodium octaborate tetrahydrate) is discussed in detail below.

A. Un-Refined Borates.

Un-refined borates are those borates that are exposed to one (or more) of the following mechanical actions, and that do not include any chemical refinement in their processing, prior to use. Typical processes that are included in the processing of un-refined borates include crushing operations, soaking, washing, sizing, and/or micronizing. During a typical crushing operation, borate ore from a mine is crushed and resized into rock pieces 8 inches or less. Following the crushing operation, the rock is delivered to a water-filled pit and left for 16-24 hours in a soaking process. Intermittently during the soaking, the material is turned to loosen clay from the surface of the ore. During the washing process, the product is then transferred into a rotary drum and is washed with high pressure water to remove additional clay from the ore. At the end of the rotary drum is a 25 millimeter screen for separating the ore in the sizing operation. The larger material goes directly to a sorting belt and the particles having a size below 25 millimeters enters a spiral classifier. The ore below 3 millimeters is then separated and the coarse fraction is returned to the sorting belt which is transporting the material larger than 25 millimeters. The product size at this stage ranges from approximately 3 millimeters to 150 millimeters. Finally, the product enters the micronizing stage, wherein the sized borate ore is crushed and hammer milled to a particle size less than 2,800 microns. These particles are then processed through a rotary dryer to a moisture level of less than 7%, milled, and air classified to a particle size ranging from about 0.15 microns to about 120 microns.

B. Refined Borates.

Refined borates generally include those borates that are exposed to both chemical and mechanical steps prior to use. Typical processes that are included in the processing of refined borates include crushing, dissolving, settling, crystallizing, filtering, and drying. In the crushing step of the process, borate ore from the mine is crushed before refining. Crushers reduce the ore to approximately one-inch pieces, increasing the surface area of the ore, which makes the refining process more efficient. In the subsequent dissolving step, the crushed ore is mixed with hot water to create a "liquor" which is a combination of borates and water. The borates dissolve in the hot water, while screens remove insoluble material such as rocks, sand and other solids, thus forming a saturated borate solution. Additionally, the hot water solution can optionally be reacted with sulfuric acid if boric acid is to be manufactured. In the settling process step, the saturated borate solution is pumped into large settling tanks called thickeners. As the rock and clay mixture is heavier, it settles in the bottom of the thickener, leaving borates dissolved in the liquor. A crystallizing step is next. The liquor is transported to tanks called crystallizers, where the solution slowly cools. The cooling forces the borates to crystallize and come out of solution, forming a slurry of borate crystals and water. The slurry is poured over special filters and washed to ensure purity in the filter process step. Water from the filtering process is typically drawn away by a vacuum located beneath the filters. At the drying step, the damp borate crystals are removed from the filters and transported to rotating dryers where hot air is used to finish the crystal drying process. Typical particle size ranges for the dried, refined borate are from about 5 microns to about 1,900 microns. The large particle size of these refined borates is too course to be suspended in liquid, and they cannot be micronized, due to compaction issues. The compaction test results detailed herein (Example 2) demonstrates that some refined borates, such as borax decahydrate, cannot be milled/air classified to a fine particle size (0.7 microns-100 microns), packaged, and palletized. Internal particle moisture exposed after the milling process results in agglomeration and compaction of particles during storage, rendering the product unusable in a blended suspension. Boric acid cannot be sized due to agglomeration of the particles into an unusable hard mass (FIG. 2) during the milling process.

C. Borate Crosslinking Systems.

In accordance with the present disclosure, the viscosifying well treatment fluids described herein comprise two general components, a first fluid system comprising the guar- or other crosslinkable organic polymer in a suitable base fluid, and a second fluid system, equivalently referred to herein as a borate crosslinking solution, suspension or emulsion, comprising a primary crosslinking agent and a secondary crosslinking agent in an appropriate fluid, particularly a low-aromatic and/or low-viscosity base oil or hydrocarbon-based fluid, or the equivalent. After (or during) preparation, the first and second fluid systems are admixed to generate the well treating compositions of the present disclosure. Exemplary, non-limiting low-aromatic or low-viscosity base oils include, without limitation, hydrotreated light petroleum distillates which are insoluble in water and have boiling points at or above about 200° C. (about 392° F.), such as those hydrotreated light petroleum distillates sold under the trade names LVT®-200 (Calumet Penreco, LLC, Indianapolis, Ind.), which has a boiling point above 400° F., or CONOSOL® C-200 (Penreco, Houston, Tex.), which has a boiling point of 221.1-287.8° C. (430-550° F.).

In one embodiment, the low aromatic and/or low-viscosity base fluid for the borate crosslinking solution, suspension, or emulsion is a mineral or vegetable oil having a kinematic viscosity ($K_{V100}$) from about 3, or about 3.5, or about 4 up to about 15, or to about 11, or to about 10, or to about 9 centistokes at 100° C. Useful mineral oils include 40, 100, 150, 200 and 300 neutral mineral oils. Nonlimiting examples of specific liquid hydrocarbons which may be used as the base fluid for the borate crosslinking solution also include Exxon ESCAID® 110 (a petroleum distillate comprising 20% aromatics, 56.6% paraffins and 23.4% naphthenes available commercially from ESSO), Total HDF 200, Conoco LVT® oil (a mineral oil with the viscosity of 1.8 centistokes at 40° C., available from Conoco Oil Company), Conoco LVT® 200 (a mineral oil with a kinematic viscosity of 2.1 centistokes at 40° C. and less than 0.5% aromatic content, available from Conoco Oil Company), and Calumet LVT® 200 (a hydrotreated, light petroleum distillate/base oil fluid with a kinematic viscosity of about 2.1 cSt at 40° C. and less than 0.5% aromatic content, available from Calumet Penreco, LLC).

Although not necessary the second fluid system compositions (the borate crosslinking fluid system) may also contain commercial clays such as bentonite, attapulgite, sepiolite, and the like. In one embodiment, the compositions may also include an organophilic clay. Organophilic clays are clays, such as montmorillonite, hectorite, saponite, attapulgite and illite, that have absorbed amine salts. These clays may optionally be converted from water-yielding (e.g., present in the brine phase of the emulsion) to oil-yielding (e.g., present in the liquid oil phase) clays by the absorption of amine salts. Organophilic clays are preferably oil-wettable and are dispersed in the oil phase to produce viscosity and gel properties. Montmorillonite, bentonite and attapulgite are preferred, with montmorillonite more preferred. Water and methanol may optionally be used to activate the organophilic clay. The organophilic clay, when included, is present in the second fluid system in an amount from about 1, or about 2 up to about 16 pounds per barrel (ppb), or to about 10 pounds per barrel (ppb), or to about 8 ppb. Exemplary, commercially available organophilic clays suitable for use with the compositions described herein include CLAYTONE® IMG 400, available from Southern Clay Products, Inc., Gonzalez, Tex., U.S.A., or BENTONE® 38 Organoclay (a commercial hectorite-based product, available form a number of suppliers).

While any suitable boron-containing crosslinking agent may be used as the primary crosslinking agent in the crosslinking composition, it is particularly preferred in accordance with the present disclosure that the crosslinking agent is an un-refined borate. Generally, in accordance with the present disclosure, the un-refined borate crosslinking agent may be any material that supplies and/or releases borate ions in solution, and that has been processed using one or more of the mechanical means discussed above. Exemplary un-refined borates suitable for use as crosslinkers in the compositions in accordance with the present disclosure include, but are not limited to, alkali metal borates, alkali metal-alkaline earth metal borates, and the alkaline earth metal borates, as well as other suitable boron containing minerals and ores that are un-refined. In accordance with certain aspects of the present disclosure, the concentration of the un-refined borate crosslinking agent described herein ranges from about from about 0.01 kg/m³ to about 10 kg/m³, preferably from about 0.1 kg/m³ to about 5 kg/m³, and more preferably from about 0.25 kg/m³ to about 2.5 kg/m³ in the well treatment fluid.

Boron-containing minerals suitable for use as the primary, un-refined borate crosslinking agent in accordance with the present disclosure are those ores that are un-refined and that contain approximately 5 wt. % or more boron, including both naturally-occurring and synthetic boron-containing minerals and ores. Exemplary naturally-occurring, boron-containing minerals and ores suitable for use herein include but are not limited to colemanite ($Ca_2B_6O_{11}$-$5H_2O$), frolovite $Ca_2B_4O_8$-$7H_2O$, ginorite ($Ca_2B_{14}O_{23}$-$8H_2O$), gowerite ($CaB_6O_{10}$-$5H_2O$), howlite ($Ca_4B_{10}O_{23}Si_2$-$5H_2O$), hydroboracite ($CaMgB_6O_{11}$-$6H_2O$), inderborite ($CaMgB_6O_{11}$-$11H_2O$), inderite ($Mg_2B_6O_{11}$-$15H_2O$), inyoite ($Ca_2B_6O_{11}$-$13H_2O$), kaliborite (Heintzite) ($KMg_2B_{11}O_{19}$-$9H_2O$), kernite (rasorite) ($Na_2B_4O_7$-$4H_2O$), kumakovite ($MgB_3O$($OH_5$-$15H_2O$), meyerhofferite ($Ca_2B_6O_{11}$-$7H_2O$), nobleite ($CaB_6O_{10}$-$4H_2O$), pandermite ($Ca_4B_{10}O_{19}$-$7H_2O$), patemoite ($MgB_2O_{13}$-$4H_2O$), pinnoite ($MgB_2O_4$-$3H_2O$), priceite ($Ca_4B_{10}O_{19}$-$7H_2O$), preobrazhenskite ($Mg_3B_{10}O_{18}$-$4.5H_2O$), (probertite $NaCaB_5O_9$-$5H_2O$), tertschite ($Ca_4B_{10}O_{19}$-$20H_2O$), tincalconite ($Na_2B_4O_7$-$5H_2O$), tunellite ($SrB_6O_{10}$-$4H_2O$), ulexite ($Na_2Ca_2B_{10}O_{18}$-$16H_2O$), and veatchite $Sr_4B_{22}O_{37}$-$7H_2O$, as well as any of the Class V-26 Dana Classification borates, hydrated borates containing hydroxyl or halogen, as described and referenced in Gaines, R. V., et al. [Dana's New Mineralogy, John Wiley & Sons, Inc., NY, (1997)], or the class V/G, V/H, V/J or V/K borates according to the Strunz classification system [Hugo Strunz; Ernest Nickel: Strunz Mineralogical Tables, Ninth Edition, Stuttgart: Schweizerbart, (2001)]. Any of these may be hydrated and have variable amounts of water of hydration, including but not limited to tetrahydrates, hemihydrates, sesquihydrates, and pentahydrates. Further, in accordance with some aspects of the present disclosure, it is preferred that the primary, un-refined borates be borates containing at least 3 boron atoms per molecule, including but not limited to, triborates, tetraborates, pentaborates, hexaborates, heptaborates, decaborates, and the like. In accordance with one aspect of the present disclosure, the preferred primary crosslinking agent is an un-refined borate selected from the group consisting of ulexite, colemanite, probertite, and mixtures thereof.

Synthetic un-refined borates which may be used as primary crosslinking agents in accordance with the presently disclosed well treatment fluids and associated methods include, but are not limited to, nobleite and gowerite, all of which may be prepared according to known procedures. However, while synthetic un-refined borates may be used as the primary crosslinking agents in the compositions and well treatment fluids described herein, naturally-occurring un-refined borates are preferred. This is due, in part, to the fact that although the synthetic compositions have the potential of being of higher purity than the naturally-occurring materials since they lack the mineral impurities found in naturally occurring specimens, they are generally relatively low in available borate content by comparison.

The primary boron-containing crosslinking agent is preferably present in the crosslinking composition in an amount ranging from about 10 wt. % to about 60 wt. %, inclusive, preferably in an amount ranging from about 15 wt. % to about 55 wt. % (inclusive), and preferably is present in an amount ranging from about 40 wt. % to about 50 wt. %, inclusive.

The secondary boron-containing crosslinking agent, in accordance with the present disclosure, is not equivalent to (with respect to the boron-content) the primary boron-containing crosslinking agent, is a refined borate material, and further is preferably an octaborate alkaline salt. Suitable octaborate alkaline salts for use as the secondary boron-containing cross-linking agent include, but are not limited to, dipotassium calcium octaborate dodecahydrate ($K_2O.CaO.4B_2O_3.12H_2O$), potassium strontium tetraborate decahydrate ($K_2Sr[B_4O_5(OH)_4]_2.10H_2O(cr)$), rubidium calcium octaborate dodecahydrate ($Rb_2Ca[B_4O_5(OH)_4]_2.8H_2O$), and disodium octaborate tetrahydrate (DOT) ($Na_2B_8O_{13}.4H_2O$). Preferably, the secondary boron-containing crosslinking agent is disodium octaborate tetrahydrate (DOT), such as ETIDOT-67® or AQUABOR®, both available from American Borate Company (Virginia Beach, Va.)), having the molecular formula $Na_2B_8O_{13}$-$4H_2O$ and containing 67.5% (min) $B_2O_3$ and 15.0% (min) $Na_2O$.

The disodium octaborate material, such as disodium octaborate tetrahydrate (DOT), and similar octaborate materials suitable for use as the secondary boron-containing crosslinking agent in the instant compositions, is considered refined due to the unique production process. As can be seen from FIG. 1, the production process for refined DOT combines granular boric acid ($H_3BO_3/B_2O_3$=56.25%-56.32%) and borax decahydrate ($Na_2B_4O_7.10H_2O/B_2O_3$=36.47%-37.2%) in water at the ratio of 39.34 wt. % boric acid and 60.66 wt. % borax decahydrate. The DOT forms through the following, empirical chemical reaction:

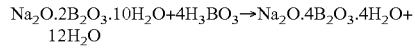

$$Na_2O.2B_2O_3.10H_2O+4H_3BO_3 \rightarrow Na_2O.4B_2O_3.4H_2O+12H_2O$$

As shown with continued reference to the general process scheme of FIG. 1, the process starts with boric acid and borax decahydrate being fed from feed silos to a solution tank, where they are admixed together with water. From the initial mixing tank, the solution is pumped to a middle mixing tank through a horizontal filter assembly, and then to a final mixing tank. Thereafter, the concentrated solution of disodium octaborate tetrahydrate (DOT) is homogenized, filtered, and maintained at a temperature of about 98° C. (208.4° F.). The mixture then passes through a high-speed atomizer (~10,000 rotations per minute) as it enters a spray dryer, where it is dispersed at very high speed against pressurized hot air (380° C.; 716° F.). Fine, dry particles of DOT are formed and subsequently separated in cyclones, producing a finished product (99.9% minimum purity) with a particle size ranging from about 1 micron (μm) to about 200 microns with a chemical composition of $Na_2O$ (at least about 14.7%), $B_2O_3$ (at least about 67.1%), and $H_2O$ (18.2%). The inherent fine particle size distribution of the DOT requires no micronizing, and the simulated compaction test of Example 2, and the associated FIG. 3, demonstrates the free-flowing characteristics of this refined borate.

In accordance with the present disclosure, the secondary, refined boron-containing crosslinking agent is present in the crosslinking composition in an amount ranging from about 0.1 wt. % to about 10.0 wt. %, inclusive, and more preferably in an amount ranging from about 0.5 wt. % to about 4 wt. %, inclusive. In accordance with other aspects of the present disclosure, the primary boron-containing crosslinking agent is present in an amount (wt. %) relative to the amount (wt. %) of the secondary boron-containing agent in a ratio of from about 70:0.1 to about 17:1, inclusive.

Preferably, the primary and secondary (un-refined and refined) borates are present in the second fluid in a ratio (in weight percent, wt. %) ranging from about 30:0.1 to about 50:20, inclusive, including ranges from about 40:0.1 to about 45:10, and from about 40:0.1 to about 50:5. Additional exemplary ranges include wt. % ranges of primary-to-secondary borates in the second fluid from about 40:0.5 to about 45:5, and from about 42:0.1 to about 44:2.5.

In yet another embodiment of the present disclosure, fluids for treating (including fracturing and hydraulic fracturing) subterranean formations may be prepared using the compositions described herein. In particular, delayed cross-linking fracturing fluid systems comprising a borate system prepared in accordance with the instantly disclosed processes may be prepared, wherein the fluid or system is prepared by a process comprising the steps of (a) providing an aqueous mixture of one or more hydrated galactomannan gums or related compounds, such as guar or hydroxypropyl guar (HPG); and (b) adding to the aqueous mixture a cross-linking composition for crosslinking the hydrated galactomannan gum or related compound at the environmental conditions of the subterranean formation, wherein the crosslinking composition comprises a borate system comprising a primary, un-refined boron-containing mineral or material (such as an un-refined borate), and a secondary, refined boron-containing mineral or material (such as a refined borate). The use of the two-part borate system of the present disclosure provides a crosslinking composition that exhibits a stabilized crosslink time as the boron content following the initial crosslink, the stability in crosslink time being determined by a Vortex Closure Test. Such a well treating fluid or fluid system may further comprise process steps of pumping the aqueous mixture of the hydrated galactomannan gum or equivalent and the (boron-releasing) cross-linking composition into a subterranean formation through a wellbore at fracturing pressures, and then cross-linking the hydrated galactomannan gum or related compound with borate ions released by the crosslinking composition at the conditions of the subterranean formation.

The well treatment fluid systems described herein may also further include one or more components suitable for modification of the rheological and/or chemical properties of the fluid. The well treating fluid or fluid system, particularly if the fluid is a fracturing fluid, may also typically have incorporated therein a breaker for the gelled fluid which can be any of the type commonly employed in the art for borate crosslinked guar based fluids, including enzymatic breakers as well as soluble (e.g., oxidants such as ammonium persulfate or peroxide) and limited solubility breakers.

In addition, such fluids can also contain other conventional additives common to the well service industry such as surfactants, corrosion inhibitors, and the like, as well as proppants. Propping agents are typically added to the base fluid prior to the addition of the crosslinking agent, although this is not necessary for purposes of the present disclosure. Propping agents suitable for use with fracturing fluids of the present disclosure include, but are not limited to, quartz sand grains, glass and ceramic beads, walnut shell fragments and other nut- or seed-based proppants, aluminum pellets, nylon pellets, and the like, any of which may be coated or non-coated. The propping agents are normally used in concentrations between about 1 to 8 pounds per gallon of fracturing fluid composition but higher or lower concentrations can be used as required.

The instant cross-linking compositions further comprise one or more buffering or pH control additives, such as potassium carbonate, magnesium carbonate, potassium hydroxide, sodium hydroxide, sodium phosphate, sodium hydrogen phosphate, boric acid-sodium hydroxide, citric acid-sodium hydroxide, boric acid-borax, sodium bicarbonate, ammonium salts, sodium salts, potassium salts, dibasic phosphate, tribasic phosphate, calcium oxide, magnesium oxide, zinc oxide, or other similar buffering agents, in an amount ranging from 0.1 wt. % to about 1 wt. %, inclusive. The buffering agents, when included, are effective to provide a pH for the well treating or fracturing fluid system in a range from about pH 8.0 to about pH 12.0, inclusive, including in a range from about pH 9.5 to about pH 11.7, and in a pH range from about pH 9.8 to about pH 11.5, inclusive.

The compositions may further include one or more clay viscosifiers, and further optionally clay stabilizers, the latter of which have a variety of functions, including acting to aid in the prevention of clay minerals in the reservoir rock expanding on contact with water and plugging the reservoir, by stabilizing clay particles in the fluid. Exemplary clay viscosifiers suitable for use with the compositions of the present disclosure include, but are not limited to, clays of varying shapes and sizes (such as minute, plate-like, tube-like, and/or fiber-like particles having a large surface area), such as clay minerals of the montmorillonite (smectite) group, including montmorillonite, saponite, nontronite, hectorite, and sauconite; clay minerals of the kaolin group such as kaolinite, nacrite, dickite, and halloysite; clay minerals of the hydrousmica group, such as hydrobiotite, glauconite, illite and bramallite; clay minerals of the chlorite group, such as chlorite and chamosite; clay minerals not belonging to the above groups, such as vermiculite, attapulgite, and sepiolite; and mixed-layer varieties of such minerals. Exemplary clay stabilizers which may be used with the compositions of described herein include chloride-free clay stabilizers, such as amines, neutralized amines, and quaternary polyamines, as well as mixtures thereof. An exemplary clay stabilizer is CLAY TREAT-3C™, a clay stabilizer substitute for potassium chloride, available from Baker Hughes, Inc. (Houston, Tex.).

The compositions of the present disclosure may further contain a number of optionally-included additives, as appropriate or desired, such optional additives including, but not limited to, suspending agents/anti-settling agents, stabilizers, deflocculants, breakers, chelators, non-emulsifiers, fluid loss additives, biocides, weighting agents, wetting agents, lubricants, friction reducers, pH control agents, oxygen scavengers, surfactants, fines stabilizers, metal chelators, metal complexors, antioxidants, polymer stabilizers, freezing point depressants, scale inhibitors, scale dissolvers, shale stabilizing agents, corrosion inhibitors, wax inhibitors, wax dissolvers, asphaltene precipitation inhibitors, waterflow inhibitors, sand consolidation chemicals, leak-off control agents, permeability modifiers, micro-organisms, viscoelastic fluids, gases, foaming agents, and combinations thereof, such that none of the optionally-included additives adversely react or effect the other constituents of these inventions.

Various breaking agents may also be used with the methods and compositions of the present disclosure in order to reduce or "break" the gel of the fluid, including but not necessarily limited to enzymes, oxidizers, polyols, aminocarboxylic acids, and the like, along with gel breaker aids. One of ordinary skill in the art will recognize the appropriate type of additive useful for a particular subterranean treatment operation. Further, all such optional additives may be included as needed, provided that they do not disrupt the structure, stability, mechanism of controlled delay, or subsequent degradability of the crosslinked gels at the end of their use.

The compositions may also include one or more alkyl carbonates, alkyl glutamates, alkyl glycols, alkyl glycol ethers, alkyl glucosides, alkyl pyrrolidones, alkyl sarcosinates, alkyl succinates, alkyl sorbitans, as well as sugar alcohols, monosacchardies, and disaccharides as biodegradable, non-toxic additives which may serve to stabilize, solubilize (e.g., acting as a solvent or co-solvent), help delay crosslink, demulsify, and/or chelate the compositions to which they are added. Examples of suitable alkyl carbonates include, but are not limited to, ethylene carbonate, propylene carbonate, glycerine carbonate, diethyl carbonate, and butylene carbonate, as well as combinations thereof. Suitable saccharides include, but are not necessarily limited to glucoses, mannose, galactose, fructose, lactose, and the like, and suitable sugar alcohols include, but are not necessarily limited to sorbitol, xylitol, mannitol, and the like, and mixtures thereof. For example, and without limitation, the composition that comprises the first and second (unrefined and refined) borate crosslinking agents may further include one or more such biodegradable additives, particularly an alkyl carbonate.

In accordance with some embodiments, the compositions may further include one or more surfactants selected from the group consisting of cationic, anionic, zwitterionic, amphoteric, nonionic, and combinations thereof. Without limitation, suitable surfactants for use herein include those surfactants described in U.S. Pat. No. 7,150,322 (Szymanski, et al., issued Dec. 19, 2006), U.S. Pat. No. 5,566,760 (Harris, issued Oct. 22, 1996), and U.S. Pat. No. 6,966,379 (Chatterji, et al, issued Nov. 22, 2005). The surfactant may be a soap-like molecules containing a long hydrophobic paraffin chain with a hydrophilic end group. Surfactants include cationic, anionic, nonionic or amphoteric compounds such as for example, betaines, sulfated or sulfonated alkoxylates, alkyl quarternary amines, alkoxylated linear alcohols, alkyl sulfonates, alkyl aryl sulfonates, $C_{10}$-$C_{20}$ alkyldiphenyl ether sulfonates, and the like, and any combination thereof. Examples of suitable surfactants include polyethylene glycols, ethers of alkylated phenol, sodium dodecylsulfate, alpha olefin sulfonates such as sodium dodecane sulfonate and trimethyl hexadecyl ammonium bromide. The surfactant may include or consist of one or more nonionic surfactant. Preferred nonionic surfactants have a generally low hydrophile-lipophile balance ("HLB") values. Commercially available nonionic surfactants include, but are not limited to, ENVIROGEM™ AE01, ENVIROGEM™ AE02, and ENVIROGEM™ AE03 available from Air Products and Chemicals. Inc., of Allentown, Pa., and RHODOCLEAN™ HP, available from Rhodia Inc. of Cranbury, N.J. The surfactant may include a tertiary alkyl amine ethoxylates. Nonlimiting examples of amphoteric surfactants that may be used include lauryl amine oxide, a mixture of lauryl amine oxide and myristylamine oxide, cocoamine oxide, lauryl betaine, oleyl betaine, cocoamido propyl betaine, or combinations thereof. Other suitable, exemplary surfactants for use herein include, without limitation, those surfactants available from Conlen SurfactantTechnology, Conroe, Tex. (USA). The amount of surfactant used, when included, can range from about 1 wt. % to about 5 wt. %, inclusive, including from about 2.0 wt. % to about 3.0 wt. %, inclusive.

According to a further embodiment, the crosslinking agents release calcium ion. Calcium in particular can interact with the viscosifying agent added to increase the crosslinker viscosity by forming a network. This undesirable effect can be reduced by adding one or more chelating agents able to complex with the calcium ion.

The chelating agent may be a metal, alkali metal, or alkali earth metal (e.g. calcium) complexing agent such as sodium citrate, citric acid, malic acid, lactic acid, tartaric acid, phtalic acid, benzoic acid, ethylenediaminetetraacetic acid (EDTA), dimethylethylenediaminotetraacetic acid (DMEDTA), cyclohexyldiaminotetraacetic acid (CDTA) and mixtures thereof. The chelating agent, when included in a composition, is present in the solution in an amount between about 0.001% to about 20%) by weight, or between about 0.01% to about 15% by weight, or between about 0.5%) to about 10%> by weight.

Other and further embodiments utilizing one or more aspects of the inventions described above can be devised without departing from the spirit of the Applicants' inventions. Further, the various methods and embodiments of the well treatment fluids and application methods described herein can be included in combination with each other to produce variations of the disclosed methods and embodiments. Discussion of singular elements can include plural elements and vice-versa.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1: Sample Preparation

Experiments were performed on a series of compositions to determine the effect of a mixture of un-refined and refined borates, as a borate source in a crosslinking composition, on a fluid viscosified with a crosslinkable polymer. The viscous fluids were prepared by mixing 250 mL of Houston, Tex. tap water, 2.5 mL of guar slurry containing 40 lb/1,000 gal of guar (GLFC-5, available from Baker Hughes, Houston, Tex.), and 0.25 mL (1 gal/1,000 gal) of clay stabilizer for 10 minutes in a Waring blender. The pH of the solutions were then adjusted to 11.3 with potassium hydroxide (KOH). The guar mixtures had initial viscosities at 511 $sec^{-1}$ from 38 cP-40 cP at 24° C. (75.2° F.), as measured on a FANN® Model 35A viscometer (available from the FANN Instrument Company, Houston, Tex.).

General Preparation of Crosslinking Suspensions.

Base slurries were prepared by combining LVT-200 (available from Calumet Specialty Partners, L.P., Indianapolis, Ind.) at concentrations from 49.8%-52.0% by weight, 9.5 g of Claytone IMG-400 (available from Southern Clay Products, Gonzales, Tex.), 1.0 mL of propylene carbonate, and 4.0 mL of CST-7605D surfactant (available from Conlen Surfactant Technology, Conroe, Tex.), 175 g of ulexite (available from American Borate Company, Virginia Beach, Va.), and 0%-2.5% by weight EDITOT-67® (disodium octaborate tetrahydrate), available from American Borate Company, Virginia Beach, Va. The components were admixed and used in the crosslink time tests described herein.

Preparation of TBC-X315 Borate Crosslinking Solution.

A first crosslinking solution containing a primary (un-refined) and secondary (refined) borate was prepared as follows. A mixture of 249.29 mL LVT-200 (Calumet Specialty Partners, L.P., Indianapolis, Ind.), Claytone IMG 400 (9.5 g, available from Southern Clay Products, Gonzales, Tex.), propylene carbonate (1 mL), 4.0 mL of CST-7605 surfactant (Conlen Surfactant Technology, Conroe, Tex.), 175 g of ulexite (Ulexite-15, available from American Borate Company, Virginia Beach, Va.), and 2.5 g. of ETIDOT-67 (disodium octaborate tetrahydrate, DOT, available from American Borate Company, Virginia Beach, Va.) were admixed and then used directly in the viscosity tests described herein.

Preparation of TBC-X318 Borate Crosslinking Solution.

A second crosslinking solution containing a primary (un-refined) and secondary (refined) borate was prepared as follows, generating a solution with a higher ratio of refined-to-un-refined borate than in the first crosslinking solution. A mixture of 242.47 mL LVT-200 (Calumet Specialty Partners, L.P., Indianapolis, Ind.), Claytone IMG 400 (9.5 g, available from Southern Clay Products, Gonzales, Tex.), propylene carbonate (1 mL), 4.0 mL of CST-7605 surfactant (Conlen Surfactant Technology, Conroe, Tex.), 175 g of ulexite (Ulexite-15, available from American Borate Company, Virginia Beach, Va.), and 10.0 g. of ETIDOT-67 (disodium octaborate tetrahydrate, DOT, available from American Borate Company, Virginia Beach, Va.) were admixed and then used directly in the viscosity tests described herein.

Details of these exemplary compositions, as well as a blank containing only an un-refined borate, ulexite, are presented in Table A, below.

TABLE A

Exemplary Formulations.

| | Formulation | | | | | |
| --- | --- | --- | --- | --- | --- | --- |
| | Blank | | TBC-X315 | | TBC-X318 | |
| Component | 350 (mL) | 42 gal. | 350 (mL) | 42 gal. | 350 (mL) | 42 gal. |
| LVT-200 | 251.56 mL | 30.19 | 249.29 mL | 29.91 | 242.47 mL | 29.10 gal. |
| Claytone IMG 400 | 9.5 g | 9.5 lb. | 9.5 g | 9.5 lb. | 9.5 g | 9.5 lb. |
| Propylene carbonate | 1.0 mL | 0.12 gal. | 1.0 mL | 0.12 gal. | 1.0 mL | 0.12 gal. |
| CST-7605 (dry) | 4.0 mL | 0.48 gal. | 4.0 mL | 0.48 gal. | 4.0 mL | 0.48 gal. |
| Ulexite 15 | 175 g | 175 lb | 175 g | 175 lb. | 175 g | 175 lb |
| ETIDOT-67 | — | — | 2.5 g | 2.5 lb. | 10.0 g | 10 lb. |
| Total Wt.[1] | 9.406 | | 9.419 | | 9.467 | |
| % by Wt. of un-refined to refined borate | 44.30 wt. %:0 | | 44.24:0.64 | | 44.02:2.51 | |

[1]Total weight of barrel.

Example 2: Comparison of Compacting Tendencies

Figure 2:
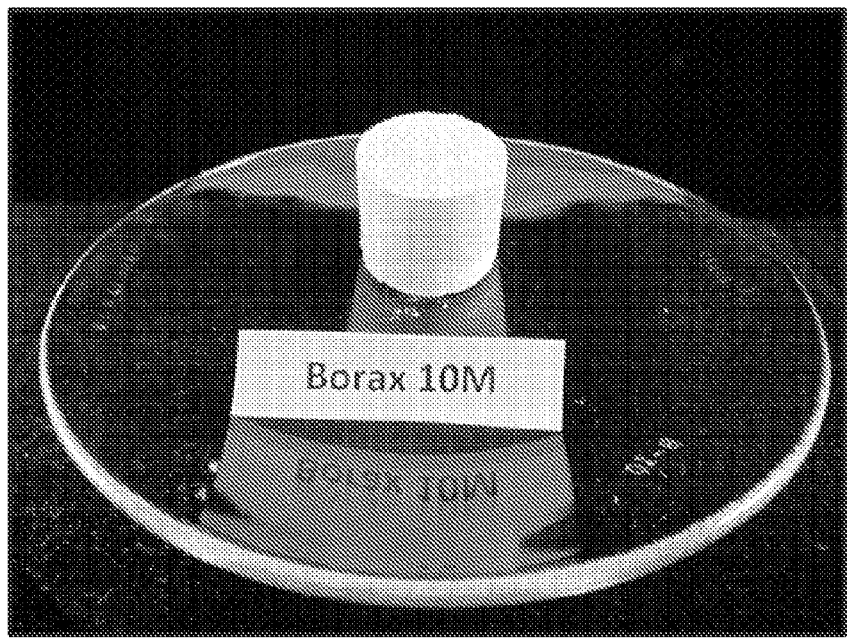
FIG. 2 illustrates the physical characteristics of a milled borax decahydrate sample after the compaction test of Example 2.
Figure 3:
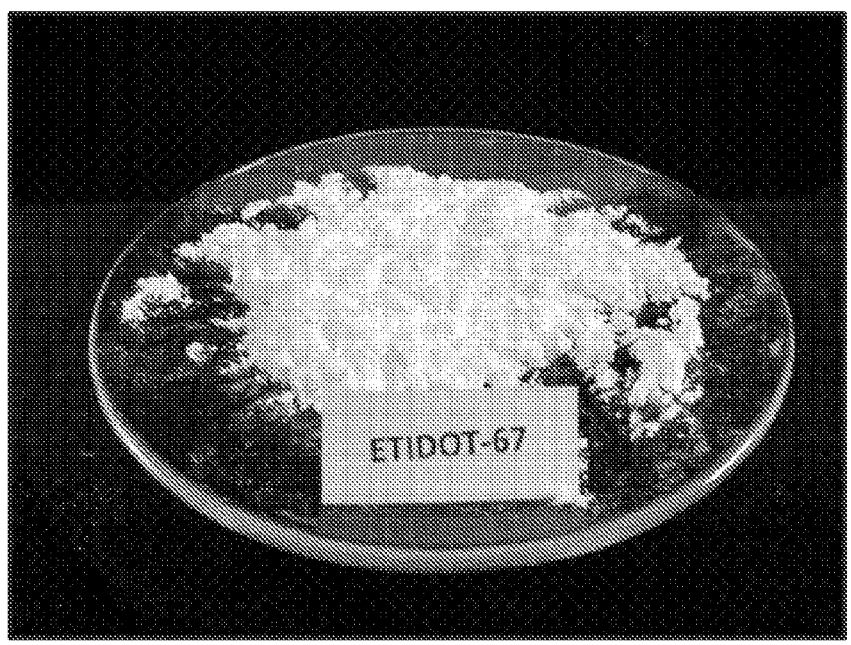
FIG. 3 illustrates the physical characteristics of a DOT sample after the compaction test of Example 2.

The compacting tendencies of exemplary refined borates, borax decahydrate (milled particle size distribution of D10-10 microns, D50-30 microns, D90-63 microns), and disodium octaborate tetrahydrate (DOT produced particle size distribution of D10-7 microns, D50-27 microns, D90-92 microns), such as described in Example 1, were compared using the following testing method:

Seventeen gram samples of borate powder, borax decahydrate, or DOT, were placed on a filter pad in the chamber of a stainless steel test cylinder. The powders were compressed by inserting a metal plunger into the cylinder, placing the cylinder on a Carver hydraulic press, and applying 1,000 psi of pressure for 5 seconds. The samples were then removed from the press and the cylinder, and aged at atmospheric conditions, approximately 25° C. (77° F.) for a period of 24 hours. Pressure was then applied (with fingers) to determine the hardness and free-flowing characteristics of the compacted borate. The results of these tests are shown in FIG. 2 and FIG. 3. Notably, the borax decahydrate (FIG. 2) is solidified into a pellet suggesting that this particular compound would be un-suitable for use in the borate suspensions of the present invention. The disodium octaborate tetrahydrate (DOT) product (FIG. 3) exhibits a distinctly different characteristic, that of a free-flowing powder, making it very attractive for use in the currently described compositions.

Example 3: Crosslinking Evaluation Procedure

The degree of cross-linking of several of the boron-containing compositions prepared as described herein was determined using standard methods, as described, for example, in U.S. Pat. No. 7,018,956. In general, to conduct the crosslinking tests a guar solution was prepared as previously explained, and the mixing speed of the blender motor was adjusted using a rheostat (e.g., a Variac voltage controller) to form a vortex in the guar solution so that the acorn nut (the blender blade bolt) and a small area of the blade, that surrounds the acorn nut in the bottom of the blender jar was fully exposed, yet not so high as to entrain significant amounts of air in the guar solution. While maintaining mixing at this speed, 0.5 mL (2 gal/1,000 gal) of boron-containing crosslinking additive was added to the guar solution to effect crosslinking. Upon addition of the entire boron-containing material sample to the guar solution, a timer was simultaneously started. The crosslinking rate is expressed by two different time recordings: vortex closure ($T_1$) and static top ($T_2$). $T_1$ is defined herein as the time that has elapsed between the time that the crosslinking additive is added and the time when the acorn nut in the blender jar becomes fully covered by fluid. $T_2$ is defined as the time that has elapsed between the time that the crosslinking additive/boron-containing material is added and the time when the top surface of the fluid in the blended jar has stopped rolling/moving and becomes substantially static. Those of ordinary skill in the art of evaluating fracturing fluids will quickly recognize the fundamental tenets of evaluating such fluids in the manner described in these Examples, although individual testing practices and procedures may vary from those described herein.

In an initial experiment, a crosslink time comparison for both un-refined borate and un-refined borate/refined borate combinations, in hydrocarbon suspensions, were evaluated. The results of these tests are shown in Table B.1, below.

TABLE B.1

Crosslink Time Comparison.

| Composition (grams) | | Crosslink Time, min:sec | | | |
|---|---|---|---|---|---|
| Un-refined[1] | Refined[2] | Vortex Closure (VC) | Change (%) | Static Top (ST) | Change (%) |
| 175 | 0 | 9:59 | — | 11:40 | — |
| 185 | 0 | 8:45 | 12.4 | 10:26 | 10.6 |
| 175 | 0.5 | 7:20 | 26.5 | 8:36 | 26.3 |
| 175 | 1.5 | 6:48 | 31.9 | 7:46 | 33.4 |
| 200[3] | 0 | 6:04 | 39.2 | 7:08 | 38.9 |
| 175 | 2.5 | 3:22 | 66.3 | 4:12 | 64.0 |
| 175 | 5.0 | 2:29 | 75.1 | 2:56 | 74.9 |
| 175 | 7.5 | 2:11 | 78.1 | 2:32 | 78.3 |
| 175 | 10.0 | 1:14 | 87.6 | 1:26 | 87.7 |

[1]Ulexite, particle size $D_{50}$ of 15 microns.
[2]Disodium octaborate tetrahydrate (DOT), particle size $D_{50}$ of 27 microns.
[3]Maximum concentration allowable to prevent suspension gelation.

As can be seen from this table, the results of this Example demonstrate the ability of the compositions described herein to produce dramatic changes in crosslink times of well treatment fluids. Table A illustrates that incremental increases of DOT combined with ulexite will progressively accelerate crosslink times, and that a composition containing 175 g of ulexite with 10 g of DOT can vary the crosslink time (as measured by static top test) about 87.7% from a composition which only contains 175 g of ulexite.

TABLE B.2

Crosslink Time Comparison for Ulexite (un-refined borate) and a secondary, boron-containing crosslink modifier.

| Composition (grams) | | Crosslink Time, min:sec | | | |
|---|---|---|---|---|---|
| Un-refined borate[1] | Secondary borate | Vortex Closure (VC) | Change (%) | Static Top (ST) | Change (%) |
| 200 | 0 | 12:50 | — | 14:15 | — |
| 190 | 10[2] | 9:02 | 29.6 | 7:41 | 46.1 |
| 190 | 10[3] | 8:20 | 35.1 | 10:02 | 29.6 |
| 190 | 10[4] | 4:53 | 61.9 | 5:38 | 60.5 |
| 190 | 10[5] | 4:31 | 64.8 | 5:21 | 62.5 |
| 190 | 10[6] | 2:54 | 77.4 | 3:29 | 75.6 |

[1]Ulexite $D_{50}$-15 microns, un-dried; IA-35.
[2]10-molar borax.
[3]Dried ulexite, $D_{50}$-15 microns.
[4]Disodium octaborate tetrahydrate.
[5]5-molar borax.
[6]boric acid.

Example 4: Viscosity Comparison of Refined and Un-Refined Borate Combinations

Tests were performed to compare the viscosities generated by a crosslinking suspension containing un-refined borate (blank), and crosslinking suspensions formulated with un-refined borate and various concentrations of refined borate, using the guar mixture and crosslinking evaluation procedure described in Example 2. The boron-containing crosslinking additives utilized in the crosslinking procedure were TBC-X315 and TBC-X318 whose compositions are described herein. The viscosities of the crosslinked fluids were conducted on a Grace M5600 rheometer (available from Grace Instrument Company, Houston, Tex.) for 2 hr:10 min, at a temperature of 110° C. (230° F.), and 400 psi of pressure. The results are shown in Table C, below.

TABLE C

Viscosity Comparison.

| | Viscosity @ 100 sec$^{-1}$, cP | | | | |
|---|---|---|---|---|---|
| Value | Blank[2] | TBC-X315[3] | % Change[1] | TBC-X318[4] | % Change[1] |
| Average | 914.7 | 1,317.5 | 44.0 | 1,348.6 | 47.4 |
| Max./Peak | 1,295.9 | 2,218.4 | 71.2 | 1,937.9 | 49.5 |
| Min. after Peak | 687.5 | 921.4 | 34.0 | 1,048.6 | 52.5 |

[1]Percent change, relative to the blank.
[2]The blank contains 175 g. ulexite, having a particle size $D_{50}$ of 15 microns.
[3]Prepared as per Example 1, containing 175 g. ulexite and 2.5 g. disodium octaborate tetrahydrate (DOT), having a particle size, $D_{50}$ of 27 microns).
[4]Prepared as per Example 1, containing 175 g. ulexite and 10 g of disodium octaborate tetrahydrate (DOT).

Figure 4:
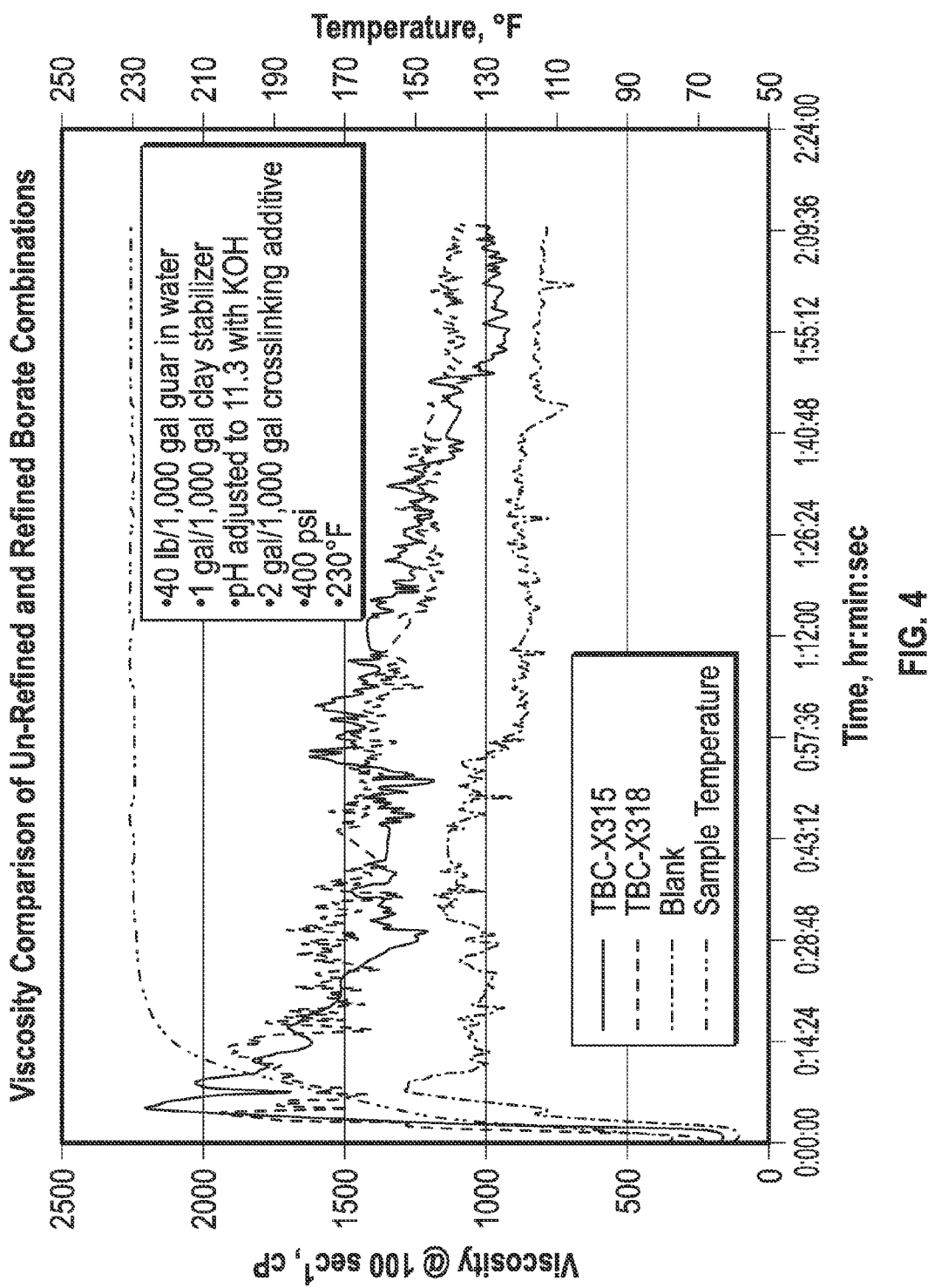
FIG. 4 illustrates an exemplary viscosity plot over time of the test of Example 3.

The results of Example 3 illustrate the ability of the compositions described herein to produce substantial changes in the viscosity of well treatment fluids. Table B shows that a composition containing 175 g of ulexite with 2.5 g-10 g of DOT will increase the average viscosity by 44.0%-47.4%, the maximum/peak viscosity by 49.5%-71.2%, and the minimum viscosity recorded after the maximum/peak viscosity by 34.0%-52.5% above the composition (blank) which contains only 175 g of ulexite. The results of these comparisons, over a 2 hr:10 min test time, are shown graphically in FIG. 4.

Example 5: Guar Concentration Comparison

Figure 5:
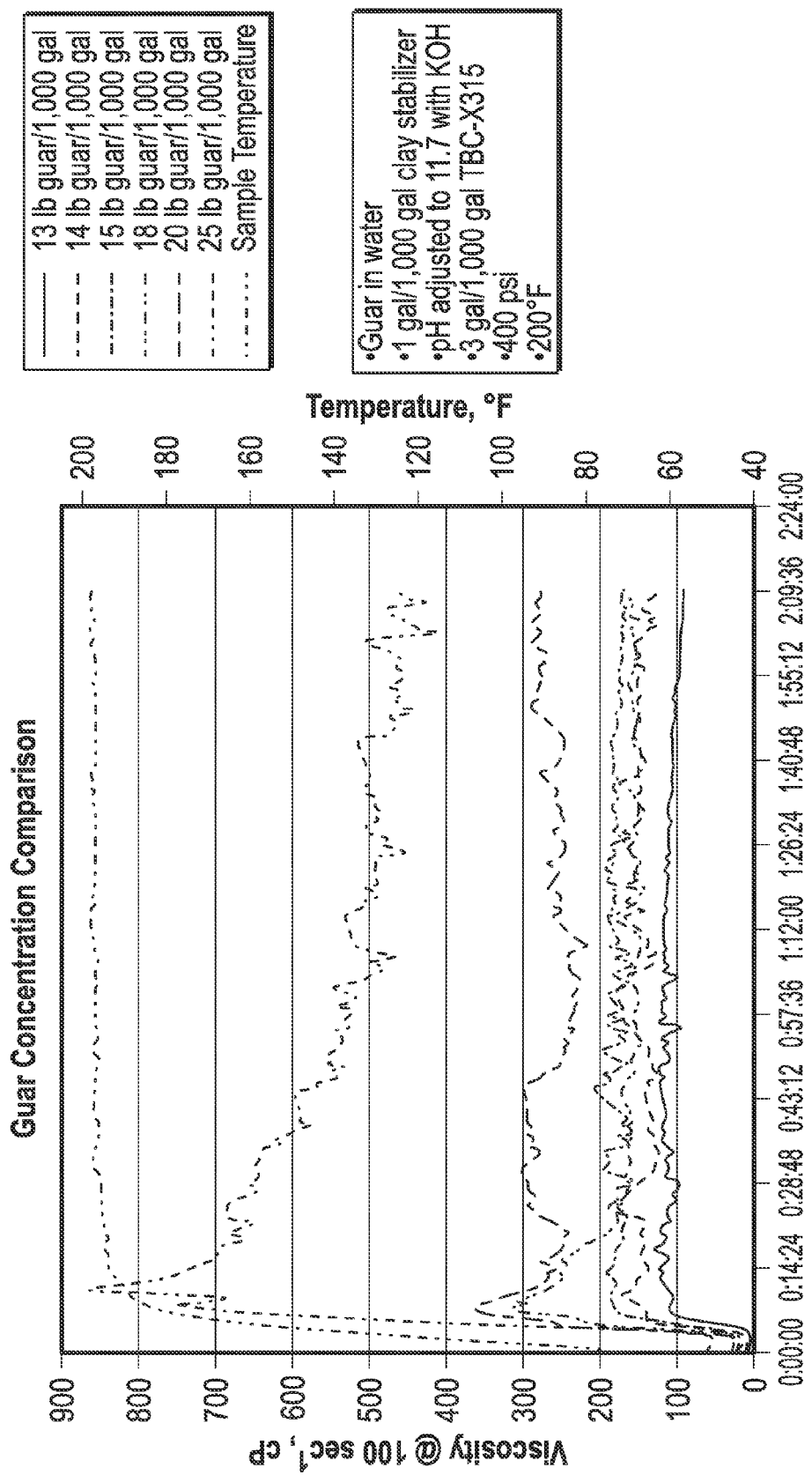
FIG. 5 illustrates a viscosity plot over time of various guar compositions at 100 $sec^{-1}$ and 200° F.

Tests were conducted to examine the viscosities produced by a crosslinking suspension containing un-refined and refined borates with various concentrations of guar. The viscous fluids were prepared by mixing 250 mL of Houston, Tex. tap water, 0.813 mL-1.563 mL of guar slurry containing 13 lb/1,000 gal-25 lb/1,000 gal of guar (GLFC-5, available from Baker Hughes, Houston, Tex.), and 0.25 mL (1 gal/1,000 gal) of clay stabilizer for 10 minutes in a Waring blender. The pH of the solutions were then adjusted to 11.7 with potassium hydroxide (KOH). The guar mixtures had initial viscosities at 511 sec$^{-1}$ from 11 cP-23 cP at 24° C. (75.2° F.), as measured by a FANN® Model 35A viscometer (available from FANN Instrument Company, Houston, Tex.). The crosslinking evaluation procedure as described in Example 2 was followed with TBC-X315, at a concentration of 0.75 mL (3 gal/1,000 gal), utilized as the boron-containing crosslinking additive. The viscosities of the crosslinked fluid were conducted on a Grace M5600 rheometer (available from Grace Instrument Company, Houston, Tex.) for 2 hr:10 min, at a temperature of 93° C. (199.4° F.), and 400 psi of pressure. The results of these comparisons are shown graphically in FIG. 5.

Example 6: Viscosity Comparison of Un-Refined and Refined Borate Combinations Using a Reduced Guar Concentration A test with a reduced guar concentration (15 lb/1,000 gal) was performed as described in Example 4 to compare the viscosities generated by a crosslinking suspension containing un-refined borate (blank) and TBC-X315 which is formulated with both un-refined and refined borates, as described in Example 3.

TABLE D

Reduced Guar Concentration Viscosity Comparison.

| | Viscosity @ 100 sec$^{-1}$, cP | | |
|---|---|---|---|
| Value | Blank[2] | TBC-X315[3] | % Change[1] |
| Average | 127.2 | 173.8 | 36.6 |
| Max./Peak | 167.7 | 209.8 | 25.1 |
| Min. after Peak | 109.4 | 161.8 | 47.9 |

[1]Percent change, relative to the blank.
[2]The blank contains 175 g ulexite, particle size D50 of 15 microns.
[3]Prepared as per Example 3, containing 175 g ulexite and 2.5 g disodium octaborate tetrahydrate (DOT), particle size D50 of 27 microns.

Figure 6:
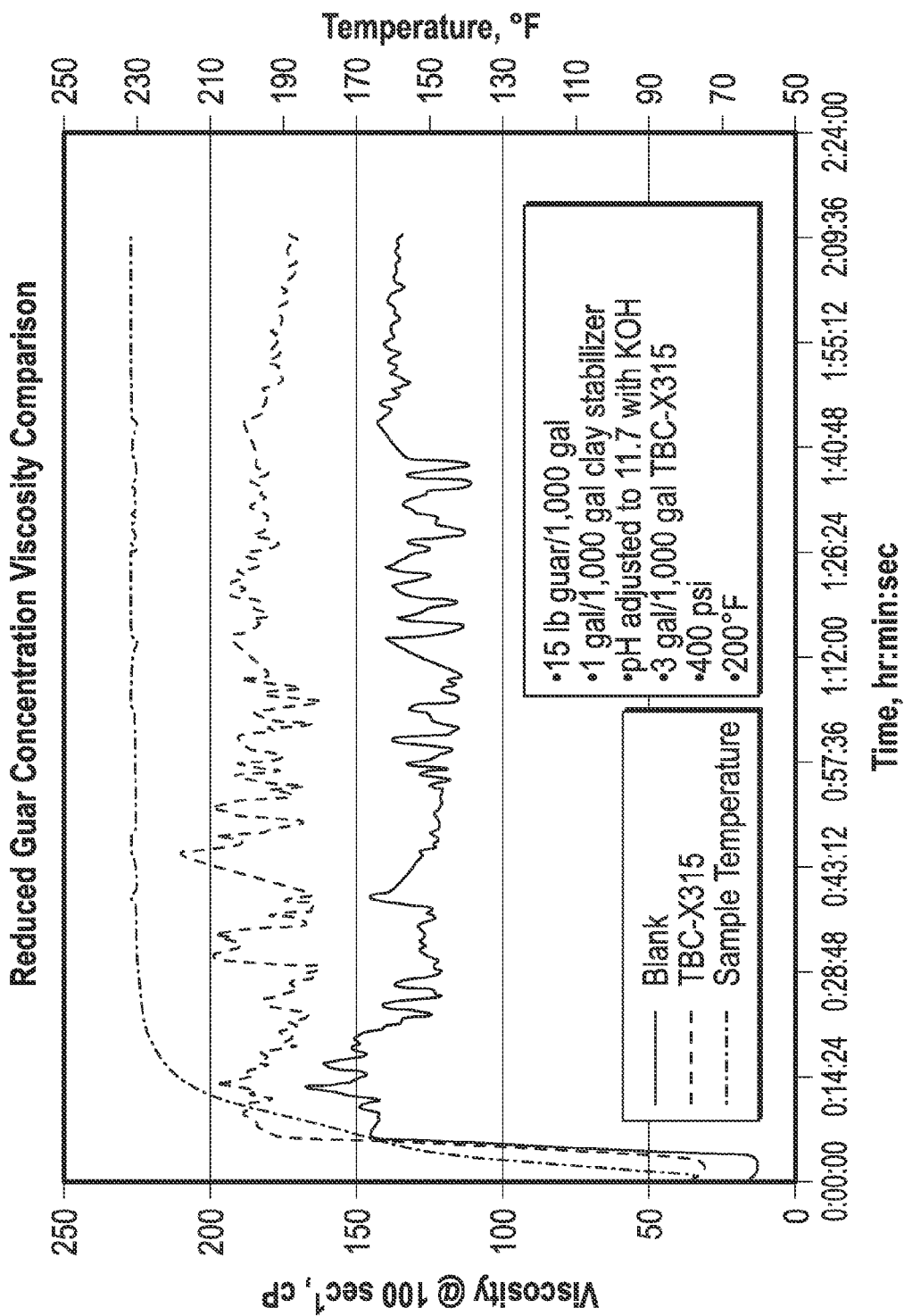
FIG. 6 illustrates an exemplary viscosity plot over time of the test of Example 6.

The results of Example 6 demonstrate the ability of the compositions described herein to produce dramatic changes in the viscosity of well treatment fluids, even with very low guar concentrations. Table D shows that a composition containing 175 g of ulexite with 2.5 g of DOT increases the average viscosity by 36.6%, the maximum/peak viscosity by 25.1%, and the minimum viscosity recorded after the maximum/peak viscosity by 47.9% above the composition (blank) which contains only 175 g of ulexite. The results of these comparisons, over a 2 hr:10 min test time, are shown graphically in FIG. 6.

Other and further embodiments utilizing one or more aspects of the inventions described above can be devised without departing from the spirit of Applicant's invention. For example, two or more different borate materials can be used as primary crosslinking agents in combination with the secondary crosslinking agent. Further, the various methods and embodiments of the methods of treating subterranean formations can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of controlling the crosslinking reaction and enhancing the viscosity of an aqueous fracturing fluid for fracturing a subterranean formation, the method comprising:
blending an aqueous fluid and a hydratable polymer that is capable of gelling in the presence of borate ions together for a period of time sufficient to form a hydrated base fluid; and
adding a crosslinking suspension to the hydrated base fluid to crosslink the hydrated base fluid, wherein the crosslinking suspension comprises an un-refined boron-containing mineral comprising ulexite, colemanite, probertite, or mixtures thereof and a refined boron-containing mineral comprising a metal octaborate material,
wherein the crosslinking suspension has a concentration of from about 0.01 kg/m$^3$ to about 10 kg/m$^3$ of the unrefined boron-containing mineral and a weight percent ratio of from about 70:0.1 to about 17:1 of the unrefined boron-containing mineral to the refined boron-containing mineral; and
wherein the crosslinking suspension crosslinks the hydrated base fluid in at least 26.3% shorter time compared to a suspension including just the un-refined boron-containing mineral and excluding the refined boron-containing mineral.

2. The method of claim 1, wherein the aqueous fluid is selected from the group consisting of fresh water, natural brines, and artificial brines.

3. The method of claim 2, wherein the artificial brines are selected from the group consisting of potassium halide solutions, sodium halide solutions, and cesium halide solutions.

4. The method of claim 1, wherein the hydratable polymer is selected from the group consisting of guar and guar derivatives, galactomannan gum, cellulose, hydroxyethylcellulose, hydroxypropyl cellulose, carboxymethylcellulose, carboxymethylhydroxyethyl cellulose, xanthan gum, diutan, scleroglucan, carrageenan, polyacrylamide, and polyacrylate.

5. The method of claim 1, wherein the suspension fluid comprises a base oil containing less than 10% aromatics.

6. The method of claim 1, wherein the un-refined boron-containing mineral contains about 5 wt. % or more of boron.

7. The method of claim 1, wherein the metal octaborate mineral is disodium octaborate tetrahydrate.

8. The method of claim 1, further comprising adding an alkaline buffer selected from the group consisting of sodium hydroxide, sodium carbonate, sodium bicarbonate, potassium hydroxide, potassium carbonate, and potassium bicarbonate to the hydrated base fluid.

9. A method of hydraulically fracturing a subterranean formation penetrated by a borehole, the method comprising:
preparing an aqueous based borate crosslinked guar fracturing fluid having a pH from about 8 to about 12, comprising:
a polymer solution comprising:
an aqueous fluid, a hydratable polymer, and
an alkaline buffer; and
a boron-containing crosslinking suspension containing an un-refined borate crosslinking agent comprising ulexite, colemanite, probertite, or mixtures thereof and a refined borate crosslinking agent comprising a metal octaborate material in a hydrocarbon fluid containing less than 10% aromatics;
pumping the fracturing fluid into the subterranean formation zone via the well bore; and
permitting the fracturing fluid to gel after having substantially traversed the well bore or after having entered the subterranean formation, thereby causing hydraulic fracturing of the subterranean formation,
wherein the crosslinking suspension has a concentration of from about 0.01 kg/m$^3$ to about 10 kg/m$^3$ of the unrefined boron-containing mineral and a weight percent ratio of from about 70:0.1 to about 17:1 of the unrefined boron-containing mineral to the refined boron-containing mineral; and wherein the crosslinking suspension crosslinks the hydrated base fluid in at least 26.3% shorter time compared to a suspension including just the un-refined boron-containing mineral and excluding the refined boron-containing mineral.

10. The method of claim 9, further comprising the steps of:

adding proppants to the fracturing fluid; and utilizing the fracturing fluid to disperse the proppants throughout the subterranean formation.

11. The method of claim 9, further comprising the step of adding a breaker to the fracturing fluid to permit the removal of the fracturing fluid from the subterranean formation.

12. The method of claim 9, wherein the aqueous fluid comprises substantially any aqueous fluid that does not adversely react with the constituents of the treating fluid, the subterranean formation, and the fluids present therein.

13. The method of claim 9, wherein the aqueous fluid is selected from the group consisting of fresh water, natural brines, and artificial brines.

14. The method of claim 9, wherein the natural, hydratable polymer is guar or guar derivatives, galactomannan gum, cellulose, hydroxyethylcellulose, hydroxypropyl cellulose, carboxymethylcellulose, carboxymethylhydroxyethyl cellulose, xanthan gum, diutan, scleroglucan, carrageenan, polyacrylamide, and polyacrylate.

15. The method of claim 9, wherein the alkaline buffer comprises alkaline compounds selected from the group consisting of sodium hydroxide, sodium carbonate, sodium bicarbonate, potassium hydroxide, potassium carbonate, and potassium bicarbonate.

16. The method of claim 9, wherein the un-refined borate crosslinking agent contains about 5 wt. % or more of boron.

17. The method of claim 9, wherein the metal octaborate is disodium octaborate tetrahydrate.

* * * * *